Patented Feb. 19, 1929.                                    1,702,629

UNITED STATES PATENT OFFICE.

JOHN H. BUCHANAN, OF AMES, IOWA, ASSIGNOR TO AMERICAN BOTTLERS OF CARBONATED BEVERAGES, OF WASHINGTON, DISTRICT OF COLUMBIA, A CORPORATION OF THE DISTRICT OF COLUMBIA.

COMPOSITION TO BE USED AS A STERILIZING AND GERMICIDAL AGENT.

No Drawing.          Application filed November 15, 1926. Serial No. 148,609.

The invention relates to a mixture of alkali and salt, whereby the sterilizing and germicidal efficiency of the alkali when in solution is increased.

The principle upon which the invention is based is that the addition of salt having the sodium ion will decrease the solubility and decrease the ionization of the alkali when in solution and thereby increase the sterlizing and germicidal efficiency of the latter.

*Addition of salts decreases the solubility.*

In order to show that the presence of salts, such as sodium chloride for example, decreases the solubility of alkaline solutions, such as sodium hydroxide for example, the following experiment is quoted, being but one of several taken from data obtained by the applicant in his laboratory.

Amyl alcohol and water were mixed together. Since amyl alcohol is only very slightly soluble in water two distinct layers would form in the solution, the one being water and the other amyl alcohol. If sodium hydroxide were added to the solutions mentioned above, it would be found that a large percentage of the reagent was present in the water and a small percentage in the amyl alcohol. If sodium chloride is now added to the water containing the sodium hydroxide, it will be found that the amount of sodium hydroxide in the amyl alcohol layer has been increased. This is attributed to the fact that the sodium chloride has reduced the solubility of the sodium hydroxide, thereby causing it to migrate into the amyl alcohol layer. The following data shows the above statements to be correct.

*Decreased solubility of sodium hydroxide in water due to the addition of sodium chloride.*

| Without sodium chloride | | With 2% added sodium chloride | |
|---|---|---|---|
| Sodium hydroxide in water layer, grams per 100 cc. | Sodium hydroxide in amyl alcohol layer, grams per 100 cc. | Sodium hydroxide in water layer, grams per 100 cc. | Sodium hydroxide in amyl alcohol layer, grams per 100 cc. |
| 3.854 | 0.18 | 3.862 | 0.197 |
| 1.927 | 0.09 | 1.919 | 0.111 |
| 0.230 | 0.05 | 0.951 | 0.080 |

A suspension of bacteria in water would be regarded in the same light as the amyl alcohol and water. If we would cause the amyl alcohol to be distributed in minute drops through the water we have a medium comparable with the bacteria and water. If we add alkali to water in which bacteria are suspended, we find at a definite temperature that the bacteria are killed in a certain time. If now we add sodium chloride to the water containing the sodium hydroxide and bacteria, we find that the bacteria are killed in a much shorter time. This is explained by the fact that the addition of the sodium chloride decreases the solubility of the sodium hydroxide thereby forcing some of the sodium hydroxide into the bacterial phase from the water phase. This sodium hydroxide which is forced from the water phase into the bacterial phase is regarded as the agent responsible for the killing.

*Addition of salts decreases the ionization.*

In order to show that the presence of salts, such as sodium chloride for example, decreases the ionization of an alkaline solution, such as sodium hydroxide for example, the following explanation is made.

For a given concentration of an alkaline compound in solution, a definite amount of dissociation occurs and a definite amount of the compound is undissociated. This results in the equilibrium constant. As an example, for sodium hydroxide this would be $$\frac{(C_{NA+})(C_{OH-})}{(C_{NaOH})} = K$$

For ordinary solutions the constant (K) does not change. If the sodium ions are increased, the equilibrium between the dissociated and undissociated is disturbed and there must be an adjustment in the undissociated portion (i. e., $C_{NaOH}$ above), being an increase in that portion. The increase in dissociated sodium ions by the addition of salts to the solution, either directly or resulting from compounding with the alkali, therefore increases the undissociated alkali, i. e., it decreases its ionization.

*Addition of salts increases sterilizing and germicidal efficiency.*

The following table shows very definitely that the addition of sodium chloride to sodium hydroxide does decrease the killing time for bacteria to a very marked degree.

*Killing time of 1% sodium hydroxide at 60° C.*

| Time in minutes | Bacteria per cubic centimeter | % bacteria surviving |
|---|---|---|
| 0 | 933,000 | 100 |
| 10 | 586,000 | 62.9 |
| 15 | 510,000 | 54.7 |
| 20 | 318,000 | 33.9 |
| 25 | 123,000 | 13.2 |
| 30 | 57,500 | 6.16 |
| 35 | 14,200 | 1.52 |
| 40 | 2,400 | 0.257 |
| 45 | 750 | 0.081 |
| 50 | | |
| 55 | | |

*Killing time of 1% sodium hydroxide with addition of 2% sodium chloride at 60° C.*

| Time in minutes | Bacteria per cubic centimeter | % bacteria surviving |
|---|---|---|
| 0 | 933,000 | 100 |
| 10 | 210,000 | 22.5 |
| 15 | 71,000 | 7.61 |
| 20 | 7,850 | 0.842 |
| 25 | 275 | 0.030 |
| 30 | | |
| 35 | | |
| 40 | | |
| 45 | | |
| 50 | | |
| 55 | | |

It is obvious from these tables that the addition of sodium chloride does decrease the killing time of sodium hydroxide on bacteria—at least a reduction of 15 minutes is noted. Actually it is better than that for with the sodium hydroxide alone the significant time is between 40 and 45 minutes. With the sodium hydroxide-sodium chloride the significant time is between 20 and 25 minutes.

The increased efficiency of the sodium chloride when added to a water solution of sodium hydroxide is further shown by the following experiment given as an illustration of this fact.

The proper bacterial suspension was treated with the following agents;—(1) one percent of sodium hydroxide, (2) one percent sodium hydroxide plus one percent sodium chloride, (3) one percent sodium hydroxide plus two percent sodium chloride (4) one percent sodium hydroxide plus three percent sodium chloride, with the following results:—

| Agent | Time for killing 99.9% of bacteria | Temperature centigrade |
|---|---|---|
| Sodium hydroxide 1% | 43 minutes | 60 C. |
| Sodium hydroxide 1% plus 1% sodium chloride. | 30 minutes | 60 C. |
| 1% sodium hydroxide plus 2% sodium chloride. | 23 minutes | 60 C. |
| 1% sodium hydroxide plus 3% sodium chloride. | 20 minutes | 60 C. |

The recommended composition or mixture of sodium hydroxide or other alkali with sodium chloride or other salt, which has the property of reducing the solubility and ionization of sodium hydroxide or other alkali in water solution, varies with the particular salt and with the alkali. For the particular composition referred to above, viz, addition of sodium chloride to sodium hydroxide in water solution, the recommended proportions are one, two, or three percent sodium chloride with one, two, or three percent sodium hydroxide. These values to represent percent by weight of the constituents named.

For purposes of sale and distribution the composition consisting of the desired proportions of sodium hydroxide or other alkali with sodium chloride or other salt can be packed in bulk to be put in water solution when ready for use, or if desired can be packed and distributed in water solution ready for use.

This invention or discovery is particularly useful and valuable for the purpose of sterilizing glass containers and other utensils used in the manufacture of food products and for the purpose of containing such food products as are put up in glass containers. Also, other chemicals previously used in composition with sodium hydroxide or other alkali as a washing and sterilizing medium, when compared with this new composition on the basis of sterilizing and germicidal efficiency, have been more expensive. This new composition therefore makes available an equally efficient or more efficient medium at less cost than could have been had in the past.

Having thus described the invention, I claim:

1. A composition consisting of sodium hydroxide and sodium chloride in a water solution, the sodium chloride being in quantity to decrease the dissociation or solubility of the sodium hydroxide, whereby the sterilizing and germicidal efficiency of the sodium hydroxide is increased.

2. A composition consisting of sodium hydroxide and a salt giving a sodium ion in a water solution, the salt being in quantity to decrease the dissociation or solubility of the sodium hydroxide whereby the sterilizing and germicidal efficiency of the sodium hydroxide is increased.

3. A composition for germicidal and sterilizing purposes consisting of sodium hydroxide and sodium chloride, the sodium chloride being in quantity to provide when in solution a decrease in the dissociation or solubility of the sodium hydroxide whereby the sterilizing and germicidal efficiency of the sodium hydroxide is increased.

4. A composition for germicidal and sterilizing purposes consisting of sodium hydroxide and a salt giving a sodium ion, the salt being in quantity to provide when in solution a decrease in the dissociation or solubility of the sodium hydroxide whereby the sterilizing and germicidal efficiency of the sodium hydroxide is increased.

JOHN H. BUCHANAN.